United States Patent Office 3,183,422
Patented May 11, 1965

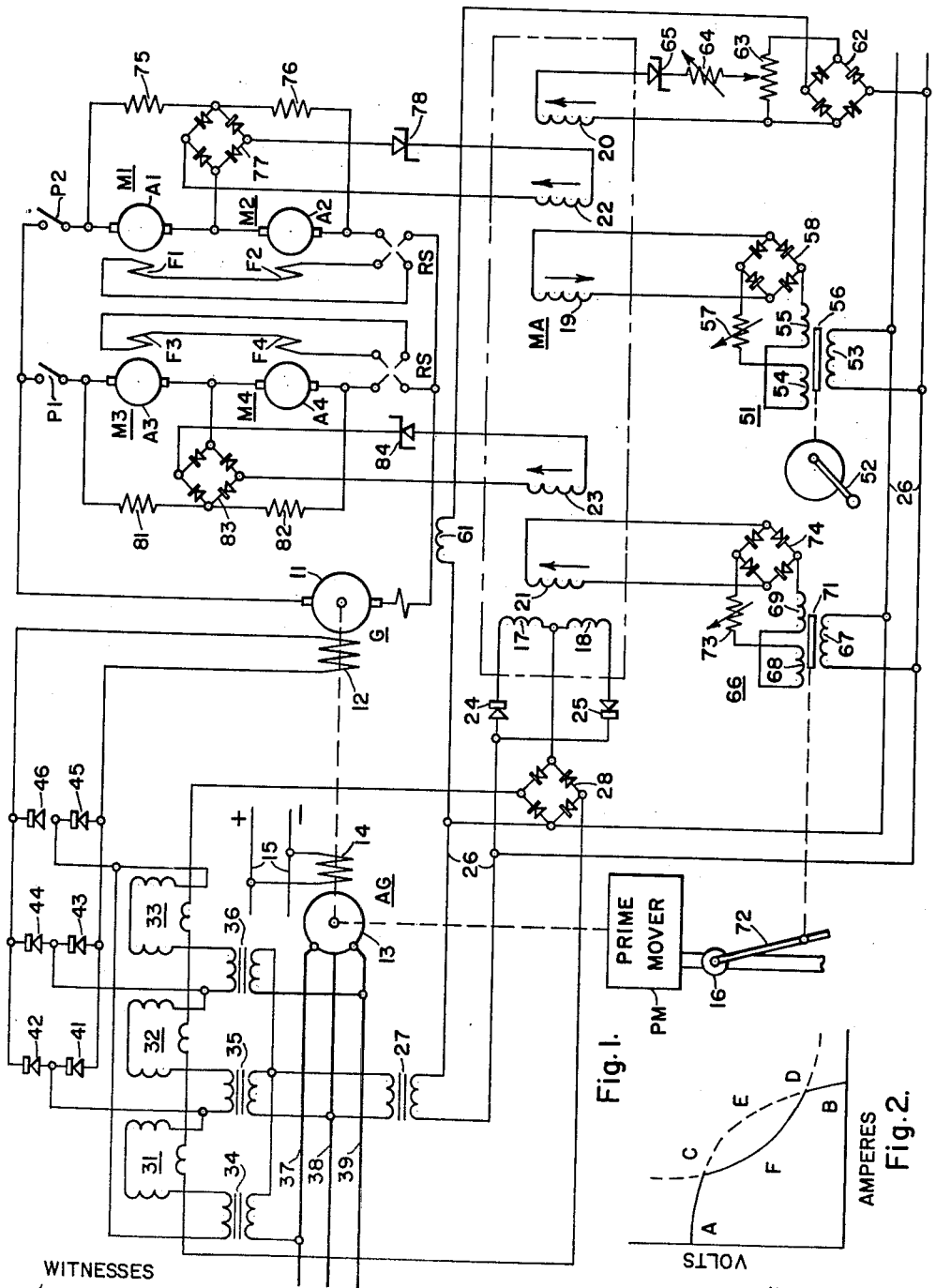

3,183,422
GENERATOR FED PLURAL MOTOR SYSTEM IN-
CLUDING VOLTAGE CONTROL, CURRENT
CONTROL AND SLIP CONTROL
John J. Stamm, Export, Pa., assignor to Westinghouse
Electric Corporation, Pittsburgh, Pa., a corporation of
Pennsylvania
Filed Feb. 18, 1963, Ser. No. 259,261
3 Claims. (Cl. 318—52)

This invention relates, generally, to control systems and, more particularly, to systems for controlling the operation of power systems having generators driven by prime movers for supplying power to operate locomotives, cranes, ships and similar electrically propelled apparatus.

An object of the invention is to provide a static excitation control system for the generator of a power system including a prime mover and electric motors.

Another object of the invention is to utilize a manually actuated differential transformer for controlling the voltage of the generator and the speed of the motors of a power system.

A further object of the invention is to limit the maximum current of the generator of the power system.

Still another object of the invention is to prevent overloading the prime mover of the power system.

A still further object of the invention is to prevent slipping of the driving wheels of an electric locomotive.

Other objects of the invention will be explained fully hereinafter or will be apparent to those skilled in the art.

In accordance with one embodiment of the invention, the excitation of a generator which supplies current to traction motors is controlled by the magnetic amplifier having a voltage control winding, a torque or current control winding, a load regulator winding and slip control windings thereon. The energization of the voltage winding is controlled by a differential transformer having a movable core actuated by a master controller. The torque winding is energized by a transductor responsive to the generator current. The load regulator winding is energized by another differential transformer having a core actuated by a fuel rack lever for the diesel engine which drives the generator. Each one of the slip control windings is energized by current resulting from an unbalance of voltage across two series connected motors each of which drives a wheel axle. The excitation of the generator is thus jointly controlled by the various control windings for operation of the system in the desired manner and within the desired limits.

For a better understanding of the nature and objects of the invention, reference may be had to the following detailed description, taken in conjunction with the accompanying drawing, in which:

FIGURE 1 is a diagrammatic view of a control system embodying the principal features of the invention; and FIGURE 2 is a curve showing operating characteristics of the generator.

Referring to the drawing, and particularly to FIGURE 1, the system shown therein comprises a main generator G, an auxiliary generator AG, a prime mover PM for driving the generators G and AG, motors M1, M2, M3 and M4, and a magnetic amplifier MA. The generator G is of the direct current type and it has an armature winding 11 and a field winding 12. The generator G supplies power for operating the motors M1 to M4, inclusive.

The auxiliary generator AG is preferably of the three-phase alternating current type having an armature winding 13 and a field winding 14. The field winding 14 may be energized through power conductors 15 which may be connected to a suitable source of direct current power (not shown). The auxiliary generator AG may be utilized for supplying power to auxiliary equipment on a locomotive or other vehicle. The auxiliary generator AG is also utilized for supplying the excitation current for the field winding 12 of the main generator G as will be described more fully hereinafter.

The motors M1 to M4 are preferably of the series type, each motor having an armature winding and a series field winding. As shown, the armatures A1 and A2 and the series field windings F1 and F2 are connected in series circuit relation. Likewise, the armatures A3 and A4 and the field windings F3 and F4 are connected in series circuit relation. The field windings are preferably connected through reversing switches RS in the usual manner to permit reversing the motors. The two pairs of series-connected motors are connected across the armature winding 11 of the generator G by switches P1 and P2. The motors may be traction motors of a type suitable for propelling a locomotive, or they may be intended for operating a crane or for driving a ship, or for other propulsion uses. In the present instance it is assumed that the motors are utilized for propelling a locomotive.

The prime mover PM is preferably an internal combustion engine, such as a diesel engine, or it may be a gas turbine, or other suitable type of prime mover. It is assumed that the prime mover is provided with a suitable fuel supply system, such as a fuel injector indicated at 16, and a governor which is not shown in the present drawing.

The magnetic amplifier MA may be of a type well known in the art. It is provided with the usual magnetic cores (not shown), load windings 17 and 18, a voltage control winding 19, a torque control winding 20, a load regulator winding 21, two slip control windings 22 and 23, and two self-saturating rectifiers 24 and 25. The current to the load windings 17 and 18 is supplied through alternating current conductors 26 which are connected across one phase of the auxiliary generator AG through a transformer 27. The output of the load windings is rectified by a rectifier bridge 28. The direct current terminals of the rectifier 28 are connected to the saturating windings of three saturable core reactors 31, 32 and 33. The alternating current windings of the reactors are energized by transformers 34, 35, and 36 which are connected to phase connectors 37, 38 and 39 which, in turn, are energized by the auxiliary generator AG. The output of the saturable core reactors is rectified by rectifiers 41 to 46, inclusive, connected in a three-phase bridge circuit, and is utilized to energize the field winding 12 of the generator G as will be explained more fully hereinafter. It will be understood that a three-phase saturable reactor might be used, if desired, instead of three single-phase reactors.

The magnetic amplifier MA may be provided with additional windings, such as bias windings, if necessary, which are not shown in the present drawing. As explained hereinbefore, the output of the magnetic amplifier MA controls the excitation of the field winding 12 of the generator G, by means of the saturable reactors 31, 32 and 33, thereby controlling the generator voltage and, therefore, the speed of the tractor motors.

The voltage control winding 19 of the magnetic amplifier produces a flux in the core of the amplifier which determines the output of the amplifier. The energization of the control winding 19 is controlled by a differential transformer 51 and a master controller 52 which may be operated by the operator of the locomotive. The differential transformer 51 has a primary winding 53 which is connected across the A.C. conductors 26 and two secondary windings 54 and 55 which are connected in series in opposed relation. The transformer 51 has a core 56 which is movable with respect to the windings 54 and 55. The core 56 may be moved by the controller 52. When the core 56 is located symmetrically with respect to the windings 54 and 55 the resultant output of the windings is zero. When the core 56 is displaced with respect to the windings 54 and 55, the output of the windings is substantially proportional to the displacement of the core. The output may be adjusted by a variable resistor 57 and rectified by a full wave bridge rectifier 58, the direct current terminals of which are connected to the control winding 19. In this manner the energization of the control winding 19 may be controlled by the master controller, thereby controlling the generator voltage and the speed of the traction motors.

In order to limit the maximum generator current, and hence the torque of the motors, the torque control winding 20 is provided on the magnetic amplifier MA. The energization of the winding 20 is controlled by a transductor 61 which is responsive to the generator current. The transductor is a saturable reactor in which the conductor carrying the generator current acts as a single turn control winding. The output winding of the transductor 61 is connected to the A.C. conductors 26, as shown, and its output is rectified by a full wave bridge rectifier 62. A potentiometer 63 is connected across the direct current terminals of the rectifier 62. The winding 20 is connected to the potentiometer 63 in series with a variable resistor 64 and a Zener diode 65. The winding 20 produces a flux in the core of the magnetic amplifier which opposes the flux produced by the control winding 19. The rectified output of the transductor 61, which is proportional to the generator current, is supplied to the winding 20 and is utilized to provide a generator output having the characteristic of a curve ACEDB shown in FIGURE 2. As shown, this curve intersects the constant horsepower curve of the prime mover at the points C and D. The potentiometer 63, the resistor 64 and the Zener diode 65 function to provide the current cutoff of the generator at any desired value. Since the Zener diode does not pass current below the breakdown voltage of the diode, it prevents the cutoff value and the generator output curve from being below the constant horsepower curve CFD of the prime mover.

In order to prevent overloading the prime mover, the load regulator winding 21 is provided on the magnetic amplifier. The energization of the winding 21 is controlled by a differential transformer 66 which is similar to the transformer 51. The transformer 66 has a primary winding 67 connected to the A.C. conductors 26 and differential windings 68 and 69. The transformer 66 has a core 71 which is movable with respect to the windings 68 and 69. The position of the core 71 is controlled by the fuel supply system for the prime mover. In the case of a diesel engine the core 71 may be actuated by a lever 72 which, in turn, is operated by the fuel rack of the fuel injection system for the engine.

The output of the windings 68 and 69, which is determined by the position of the core 71, may be adjusted by a variable resistor 73 and rectified by a full wave bridge rectifier 74. The flux produced by the winding 21 opposes the flux produced by the control winding 19. Thus, when the governor of the prime mover operates the fuel injector to supply more fuel to the engine in order to maintain the speed of the engine, the winding 21 functions to reduce the generator voltage, thereby preventing overloading of the engine. In this manner the torque control winding 20 and the load regulator winding 21 cooperate to provide a generator output curve such as the curve ACFDB shown in FIGURE 2.

In order to prevent slipping of the wheels driven by the traction motors, the slip control windings 22 and 23 are provided on the magnetic amplifier. Each one of these windings produces a flux in the core of the amplifier which opposes the flux produced by the control winding 19, thereby lowering the generator voltage. It will be understood that each motor drives one axle of the locomotive. Thus, slipping of the locomotive wheels, due to poor adhesion, causes an unbalance in the counter-electromotive force of the two motors which are connected in series circuit relation.

As shown, resistors 75 and 76 are connected across the armatures A1 and A2 to provide a bridge circuit. A full wave bridge rectifier 77 is connected between points of the bridge circuit which would normally be at the same potential when the motors M1 and M2 are operating at the same speed. The direct current terminals of the rectifier 77 are connected to the slip control winding 22. A Zener diode 78 is connected in the circuit for the winding 22. Assuming that the wheels driven by the motor M1 slip, thereby causing the voltage across the armature A1 to be higher than the voltage across the armature A2, a current flows through the rectifier 77 which is proportional to the voltage difference across the motors. The direct current output of the rectifier 77 flows through the winding 22 to cause a reduction in the generator voltage, thereby stopping the slipping of the wheels.

In order to decrease the sensitivity of the slip protection system the Zener diode 78 is provided. Since the Zener diode will not pass current below a predetermined voltage, slight differences in the motor voltages due to the inherent characteristics of the motors will not cause operation of the slip protective feature. It will be seen that the rectifier 77 functions to cause current to flow through the slip winding 22 in the same direction regardless of which one of the motors M1 and M2 has the higher voltage because of wheel slippage.

The slip control winding 23 functions in the same manner as the winding 22 to prevent slippage of the wheels driven by the motors M3 and M4. The circuit connections for the winding 23, including resistors 81 and 82, rectifier 83 and diode 84, are similar to the connections for the winding 22.

From the foregoing description it is apparent that the invention provides a power system which does not require exciters, differential fields on the machines, a hydraulically operated load regulator, and wheel slip relays. The static devices utilized in the present control system are simple and rugged in construction and are reliable in performance. Therefore, the system is suitable for controlling apparatus which is subjected to rough usage.

Since numerous changes may be made in the above-described construction, and different embodiments of the invention may be made without departing from the spirit and scope thereof, it is intended that the subject matter disclosed herein shall be interpreted as illustrative and not in a limiting sense.

I claim as my invention:

1. In a power system, in combination, a generator having an armature winding and a field winding, a prime mover for driving the generator, a plurality of pairs of series connected motors connected across the generator armature, a magnetic amplifier having a magnetic core and load coils for controlling the excitation current for the field winding of the generator, a voltage control winding for producing a flux in the core of the amplifier, manually operable control means for controlling the energization of the control winding to control the voltage of the generator, a torque control winding for producing a flux in the core of the amplifier opposing the flux of the voltage control winding, control means responsive to the generator current for controlling the energization of the torque winding, a load regulating winding for producing a flux in the core of the amplifier opposing the flux of the voltage control winding, control means responsive to the quantity of fuel being supplied to the prime mover for controlling the energization of the load regulating winding, a slip control winding for each pair of series connected motors, said slip control windings producing flux in the core of the amplifier opposing the flux of the voltage control winding, and control means responsive to a difference in the voltage across the motors of each pair of motors for controlling the energization of each one of said slip control windings.

2. In combination, a generator having an armature winding and a field winding, a prime mover for driving the generator, at least one pair of series connected motors connected across the generator armature, a magnetic amplifier having a magnetic core and load windings for controlling the excitation current of the generator field winding, a voltage control winding for producing a flux in the core of the magnetic amplifier, means for controlling the energization of said voltage control winding to control the voltage of the generator, a torque control winding for producing a flux in the core of the magnetic amplifier opposing the flux of the voltage control winding, means responsive to the generator current for controlling the energization of said torque control winding, a load regulating winding for producing a flux in the core of the magnetic amplifier opposing the flux of the voltage control winding, means responsive to the load on the prime mover for controlling the energization of said load regulation winding, a slip control winding for each pair of series connected motors for producing a flux in the core of the magnetic amplifier opposing the flux of the voltage control winding and means responsive to a difference in the voltage across the motors of each pair for controlling the energization of said slip control winding.

3. In combination, a generator having an armature winding and a field winding, a prime mover for driving the generator, at least one pair of series connected motors connected across the generator armature, a magnetic amplifier having a magnetic core and load windings for controlling the excitation current of the generator field winding, a voltage control winding for producing a flux in the core of the magnetic amplifier, means for controlling the energization of said voltage control winding to control the voltage of the generator, a torque control winding for producing a flux in the core of the magnetic amplifier opposing the flux of the voltage control winding, current responsive means for effecting energization of said torque control winding in response to the generator current when the generator current exceeds a predetermined value, a load regulating winding for producing a flux in the core of the magnetic amplifier opposing the flux of the voltage control winding, means responsive to the supply of fuel to the prime mover for controlling the energization of said load regulating winding, a slip control winding for each pair of series connected motors for producing a flux in the core of the magnetic amplifier opposing the flux of the voltage control winding, and means responsive to a difference in the voltage across the motors of each pair for controlling the energization of said slip control winding.

References Cited by the Examiner

UNITED STATES PATENTS

| 2,313,503 | 3/43 | Baldwin | 318—52 X |
| 2,626,362 | 1/53 | Johansson | 318—144 X |
| 2,790,092 | 4/57 | Guth | 290—40.2 |
| 2,929,983 | 3/60 | Abell | 318—143 |
| 3,089,991 | 5/63 | Stamm | 318—144 |

FOREIGN PATENTS 737,399  9/55  Great Britain.

ORIS L. RADER, *Primary Examiner.*